United States Patent
Armstrong

(10) Patent No.: US 10,713,200 B2
(45) Date of Patent: Jul. 14, 2020

(54) USB ADAPTER AND CABLE

(71) Applicant: NCR Corporation, Duluth, GA (US)

(72) Inventor: Kenn Armstrong, Marietta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/885,249

(22) Filed: Jan. 31, 2018

(65) Prior Publication Data
US 2019/0236040 A1    Aug. 1, 2019

(51) Int. Cl.
G06F 13/38    (2006.01)
H01R 31/06    (2006.01)
G06F 13/42    (2006.01)
H01R 107/00   (2006.01)

(52) U.S. Cl.
CPC ........ *G06F 13/385* (2013.01); *G06F 13/4282* (2013.01); *H01R 31/065* (2013.01); *G06F 2213/0016* (2013.01); *G06F 2213/0042* (2013.01); *H01R 2107/00* (2013.01)

(58) Field of Classification Search
CPC .................. G06F 13/385; G06F 13/4282
See application file for complete search history.

(56) References Cited

U.S. PATENT DOCUMENTS

| | | | |
|---|---|---|---|
| 7,310,697 B2 * | 12/2007 | Pandit | G06F 1/266 455/572 |
| 2011/0156668 A1 * | 6/2011 | Bergveld | H02M 3/07 323/266 |
| 2015/0186320 A1 * | 7/2015 | Jaussi | G06F 13/4068 710/305 |
| 2016/0364360 A1 * | 12/2016 | Lim | H01R 24/60 |
| 2017/0228338 A1 * | 8/2017 | Ikenaga | G06F 13/36 |
| 2017/0331270 A1 * | 11/2017 | Mattos | H02H 3/087 |
| 2018/0267587 A1 * | 9/2018 | Aldous | G06F 1/28 |

* cited by examiner

*Primary Examiner* — Tim T Vo
*Assistant Examiner* — Phong H Dang
(74) *Attorney, Agent, or Firm* — Schwegman, Lundberg & Woessner

(57) ABSTRACT

Disclosed is an adapter. The adapter may include a first end, a second end, a housing, and a logic circuit. The first end may be operative to connect to a terminal device. The second end may be operative to connect to a peripheral device. The housing may connect the first end to the second end. The logic circuit may be located within the housing and electrically couple the first end to the send end. The logic circuit may be operative to perform a handshake operation between the terminal device and the peripheral device to determine compatibility between the terminal device and the peripheral device.

6 Claims, 3 Drawing Sheets

USB ADAPTER AND CABLE

SUMMARY

Disclosed is an adapter. The adapter may include a first end, a second end, a housing, and a logic circuit. The first end may be operative to connect to a terminal device. The second end may be operative to connect to a peripheral device. The housing may connect the first end to the second end. The logic circuit may be located within the housing and electrically couple the first end to the send end. The logic circuit may be operative to perform a handshake operation between the terminal device and the peripheral device to determine compatibility between the terminal device and the peripheral device.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1A:
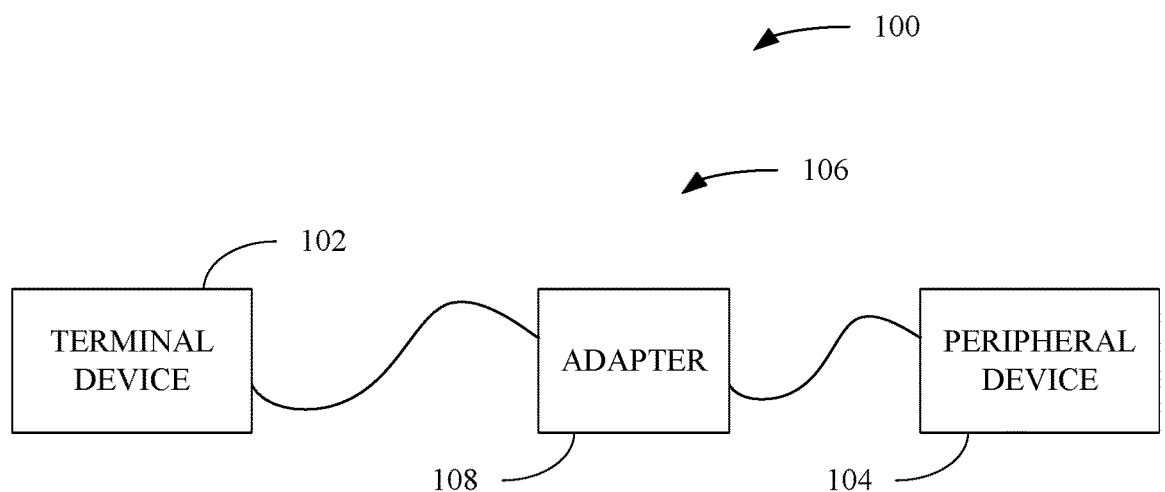
FIGS. 1A and 1B show example systems consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit this disclosure. Instead, the proper scope of any invention disclosed herein is defined by the appended claims.

One method for powering and delivering data to a printer from a terminal is to use a PoweredUSB connection at the terminal via a Y-cable that splits to separate power and USB-B connectors at the printer. The cables and connectors may be bulky and may limit the aesthetic appeal of the solution. One disadvantage becomes more prominent as users begin to use terminals resembling tablets where the real-estate for the bulky connector becomes small and the overall solution's industrial design is intended to be sleek.

A standard USB-C cable is one solution, except that the standard for USB-C only goes up to 20V. The standard voltage for higher performing printers may be greater than 20V. For example, some high performance printers may operate at 24V.

As discussed herein, a migration strategy and hardware are disclosed that may allow for use of a 24V USB-C solution. The adapters and cables disclosed herein may allow for the same terminal port to support both standard USB-C and as well as other USB standards and requirements. For example, the adapters and cables disclosed herein may allow for Y-cable for USB-C on one side, and separate power & USB-B on the other for peripherals requiring 24V or some other voltage requirement. For example, the adapters and cables disclosed herein may allow for male USB-C to female PoweredUSB adapter, male PoweredUSB-C to female USB-C, etc.

FIG. 1A shows an example operating environment 100 consistent with this disclosure. As shown in FIG. 1A, the operating environment 100 may include a terminal device 102 and a peripheral device 104. The terminal device 102 and the peripheral device 104 may be electrically coupled to one another via a cable 106. The cable 106 may include an adapter 108.

The cable 106 may be a universal serial bus (USB) cable. In addition, the cable 106 and the adapter 108 may allow for conversion from one type of cable connection to another type of cable connection. For example, the cable 106 may allow for conversion from a USB Type C connection to a PoweredUSB connection. The cable 106 may also allow for conversion from a USB Type A, B, Micro-B, etc. connection to another USB type of connection. The cable 106 may also include a Y terminal on one or both ends. In other words, the cable 106 may include two or more connection terminal types on one or both ends.

The cable 106 may also have the same type connections on each end (e.g., USB Type C connections) and allow for a voltage change used to power the peripheral device 104. For example, the terminal device 102 may output a first voltage (e.g., 12V) and the peripheral device 104 may require a second voltage (e.g., 5V, 9V, 20V, or 24V) to operate. As a result, the adapter 108 may provide circuitry to change the output voltage so as to provide the needed voltage to the peripheral device 104.

Figure 1B:
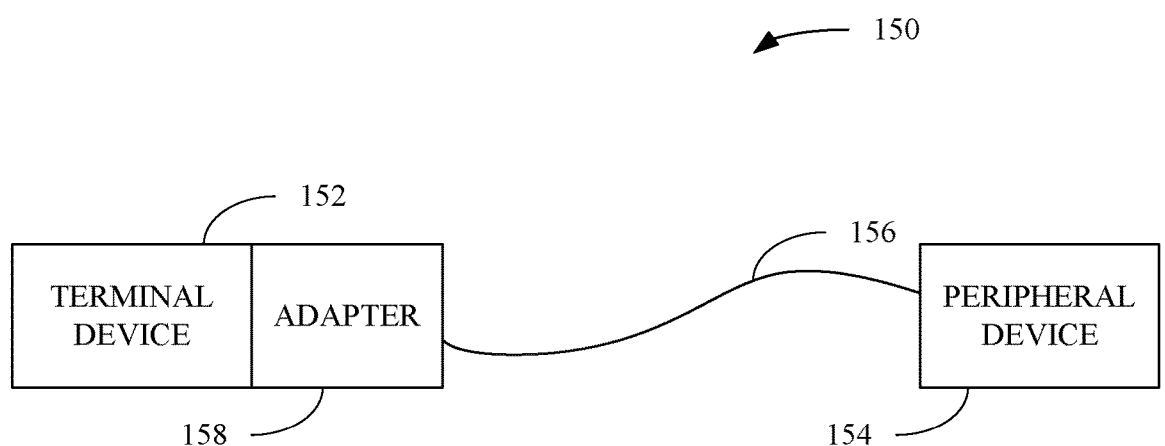

While FIG. 1A shows the adapter 108 as a component of the cable 106, the adapter 108 may be a separate component from the cable 108 as shown in the example operating environment 150 shown in FIG. 1B. For example, as shown in FIG. 1B, an adapter 158 may be a separate component that may connect to a terminal device 152 and a cable 156 may then be used to connect a peripheral device 154 to the adapter 158. While FIG. 1B shows the adapter 158 connected to the terminal device 152, the adapter 158 may also be connected to peripheral device 154 and the cable 156 may then connect the terminal device 152 to the adapter 158.

The adapter 158 may provide a conversion from one connection type to a second connection type. For example, as disclose above with respect to the cable 106, the adapter may allow for conversion from a USB Type A, B, Micro-B, etc. connection to another USB type of connection. As a result, the cable 156 may have the same connection type on each end. For instance, the cable 156 may have USB Type C connections on each end and the adapter 158 may have a USB Type C connection to receive one end of the cable 156 and connect to the peripheral device 154. The adapter 158 may also have a USB Type B connection for connecting to the terminal device 152.

Just as with the cable 106 and adapter 108 shown in FIG. 1A, the adapter 158 may allow for a voltage change. For instance, the terminal device 152 may output a first voltage (e.g., 12V) and the adapter 108 may increase the first voltage to a second voltage (e.g., 20V) needed by the peripheral device 154.

Figure 2:
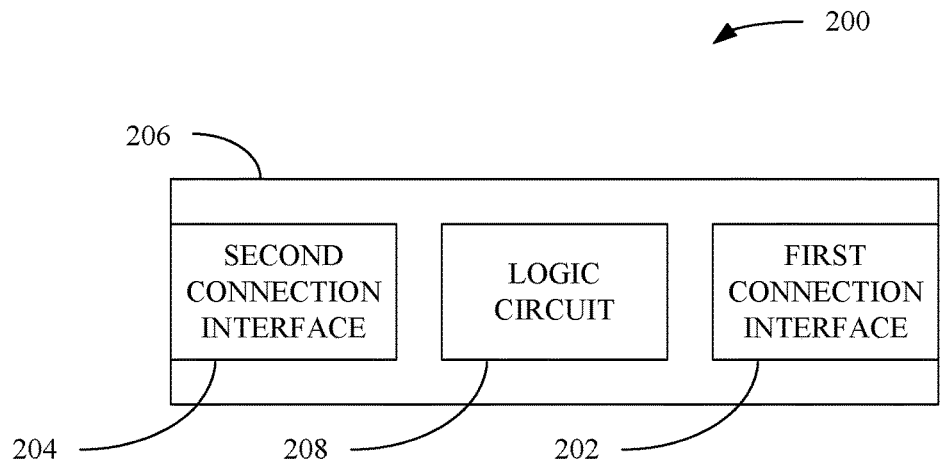
FIG. 2 shows an example schematic of an adapter consistent with this disclosure.

The adapters disclosed herein may perform a handshake operation when connected to the terminal device or the peripheral device. The handshake operation may allow the adaptor to determine if the adapter is proper for the peripheral device and configured circuitry to operate the peripheral device. FIG. 2 shows an example schematic for an adapter 200 (e.g., the adapter 108 or the adapter 158). The adapter 200 may include a first connection interface 202 and a second connection interface 204. The first connection interface 202 and the second connection interface 204 may be connect via a housing 206 and electrically coupled via a logic circuit 208.

Figure 3:
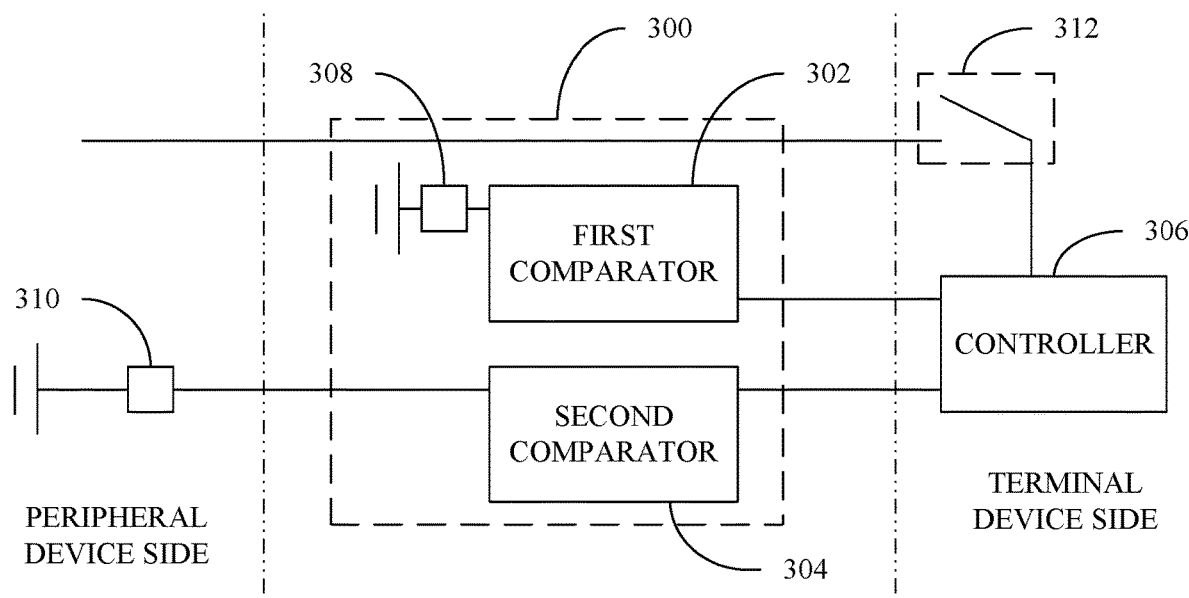
FIG. 3 shows an example logic circuit consistent with this disclosure.

FIG. 3 shows an example logic circuit 300 consistent with this disclosure. The logic circuit 300 may include a first comparator 302 and a second comparator 304. As shown in FIG. 3, a controller 306 located in the terminal device 102 (or 152) and may transmit a first signal to the first comparator 302 and a second signal to the second comparator 304.

The first signal may undergo a first electrical manipulation. For example, the first electrical manipulation may be accomplished by a first electrical component 308. The first electrical manipulation may be passing the first signal through a resistor of known resistance, an op-amp, etc.

The second signal may undergo a second electrical manipulation. For example, the first electrical manipulation may be accomplished by a second electrical component 310. The second electrical manipulation may be passing the second signal through a resistor of known resistance, an op-amp, etc.

The first comparator 302 and the second comparator 304 may be integrated circuits such as the MAX9025, MAX9060, and MAX9065, produced by Maxim integrated. In addition, the first comparator 302 and the second comparator 304 may be circuitry consisting of an op-amp comparator that includes an op-amp and resistors.

After the first electrical manipulation and the second electrical manipulation are performed, the first comparator 302 and the second comparator 304 each may transmit a third and fourth electrical signal, respectively, to the controller 306. If the third and fourth electrical signals are within a predetermined range or otherwise satisfy predetermined criteria, then the controller 306 may transmit a fifth signal to a switch 312. The fifth signal may close the switch 312 to allow power to transmit through the adapter 300 (or the cable 106 and adapter 108, or adapter 158) to power the peripheral device. Non-limiting examples of the switch 312 include a relay, a transistor, a Schmitt trigger, etc.

If the third and fourth electrical signals are not within the predetermined criteria, then the controller 306 would not transmit the fifth signal to the switch 312. As a result, the peripheral device 104 would not receive power. Stated another way, if the third and fourth electrical signals are not within the predetermined criteria, then the adapter 300 may be incompatible with either the terminal device 102 or the peripheral device 104. Thus, the controller 306 would not allow the firth signal to be transmitted to the peripheral device 104 because the voltage of the fifth signal may be inadequate to operate the peripheral device 104 or may be too high and may damage the peripheral device 104.

Figure 4:
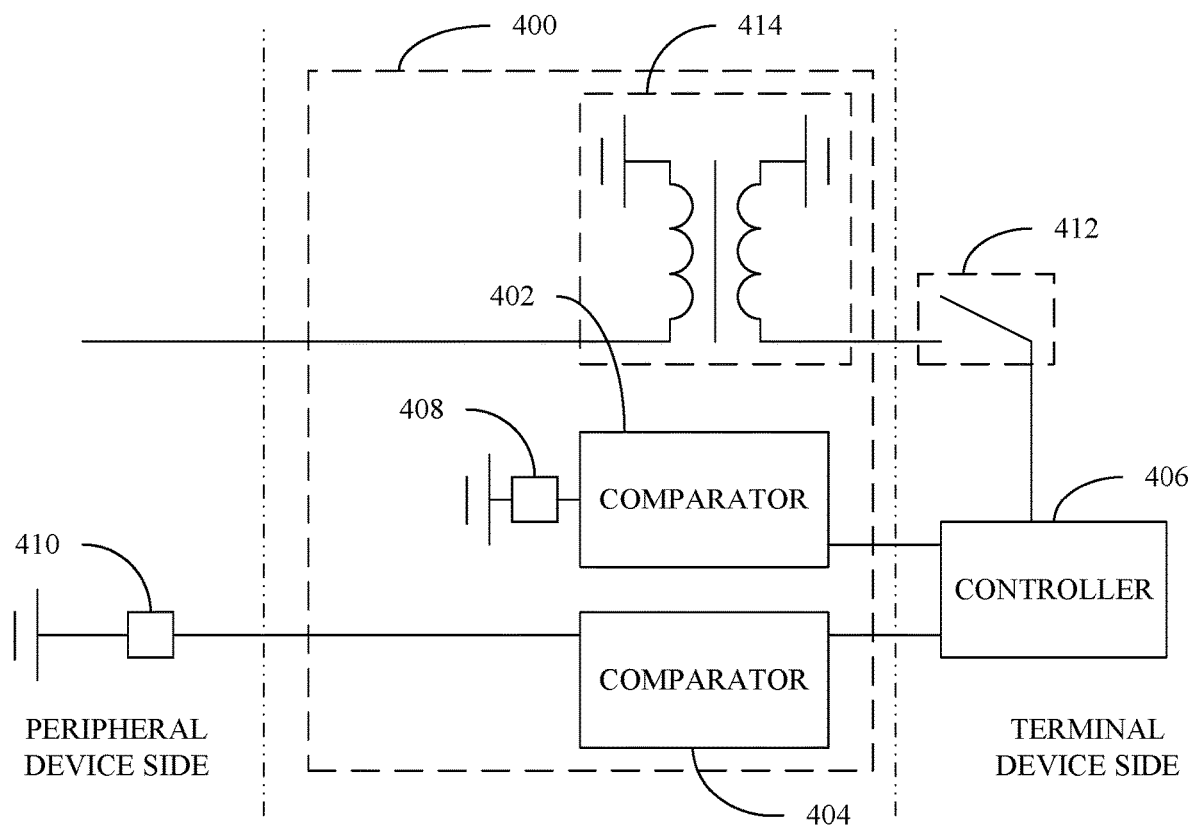
FIG. 4 shows an example logic circuit consistent with this disclosure.

FIG. 4 shows an example logic circuit 400 consistent with this disclosure. The logic circuit 300 may include a first comparator 402 and a second comparator 404. As shown in FIG. 4, a controller 406 located in the terminal device 102 (or 152) and may transmit a first signal to the first comparator 402 and a second signal to the second comparator 404.

The first signal may undergo a first electrical manipulation. For example, the first electrical manipulation may be accomplished by a first electrical component 408. The first electrical manipulation may be passing the first signal through a resistor of known resistance, an op-amp, etc.

The second signal may undergo a second electrical manipulation. For example, the first electrical manipulation may be accomplished by a second electrical component 410. The second electrical manipulation may be passing the second signal through a resistor of known resistance, an op-amp, etc.

The first comparator 402 and the second comparator 404 may be integrated circuits such as the MAX9025, MAX9060, and MAX9065, produced by Maxim integrated. In addition, the first comparator 402 and the second comparator 404 may be circuitry consisting of an op-amp comparator that includes an op-amp and resistors.

After the first electrical manipulation and the second electrical manipulation are performed, the first comparator 402 and the second comparator 404 each may transmit a third and fourth electrical signal, respectively, to the controller 406. If the third and fourth electrical signals are within a predetermined range or otherwise satisfy predetermined criteria, then the controller 406 may transmit a fifth signal to a switch 412. The fifth signal may close the switch 412 to allow power to transmit through the adapter 400 (or the cable 106 and adapter 108, or adapter 158) to power the peripheral device. Non-limiting examples of the switch 412 include a relay, a transistor, a Schmitt trigger, etc.

The power transmitted through the adapter 400 may under a voltage change. For instance, the voltage transmitted by the terminal device 102 may be 12V and the peripheral device 104 may need 20V to operate. As a result, the adapter 400 may include a transformer 414 that may step up the voltage supplied by the terminal device 102 to the required voltage needed by the peripheral device 104.

In addition to stepping up the voltage provided by the terminal device 102, the adapter 400 may step down the voltage provided by the terminal device 102. For instance, the terminal device 102 may supply 24V and the peripheral device 104 may require 20V to operate. As a result, the transformer 414 may step the 24V down to 20V.

If the third and fourth electrical signals are not within the predetermined criteria, then the controller 406 would not transmit the fifth signal to the switch 412. As a result, the peripheral device 104 would not receive power. Stated another way, if the third and fourth electrical signals are not within the predetermined criteria, then the adapter 400 may be incompatible with either the terminal device 102 or the peripheral device 104. Thus, the controller 406 would not allow the firth signal to be transmitted to the peripheral device 104 because the voltage of the fifth signal may be inadequate to operate the peripheral device 104 or may be too high and may damage the peripheral device 104.

EXAMPLES

Example 1 is an adapter comprising: a first end operative to connect to a terminal device; a second end operative to connect to a peripheral device; a housing connecting the first end to the second end; and a logic circuit located within the housing and electrically coupling the first end to the send end, the logic circuit operative to perform a handshake operation between the terminal device and the peripheral device to determine compatibility between the terminal device and the peripheral device.

In Example 2, the subject matter of Example 1 optionally includes wherein the logic circuit is further operative to increase a voltage of a first signal transmitted from the terminal device to the peripheral device.

In Example 3, the subject matter of any one or more of Examples 1-2 optionally include wherein the logic circuit is further operative to decrease a voltage of a first signal transmitted from the terminal device to the peripheral device.

In Example 4, the subject matter of any one or more of Examples 1-3 optionally include wherein the first end is a USB-C type connector and the second end is a USB-B connector.

In Example 5, the subject matter of any one or more of Examples 1-4 optionally include wherein the first end is a USB-C type connector and the second end is a PoweredUSB connector.

In Example 6, the subject matter of any one or more of Examples 1-5 optionally include wherein the adapter is a portion of a cable connecting the terminal device to the peripheral device.

Example 7 is an adapter comprising: a first end operative to connect to a terminal device; a second end operative to connect to a peripheral device; a housing connecting the first end to the second end; and a logic circuit located within the housing and electrically coupling the first end to the send end, the logic circuit operative to: perform an electrical manipulation to a first signal received at the first end or the second end, and allow a second signal to pass from the terminal device to the peripheral device when the electrical manipulation of the first signal resulted in a predetermined outcome.

In Example 8, the subject matter of Example 7 optionally includes wherein logic circuit includes an integrated circuit.

In Example 9, the subject matter of any one or more of Examples 7-8 optionally include wherein the electrical manipulation includes an increase or decrease in a voltage of the first signal.

In Example 10, the subject matter of any one or more of Examples 7-9 optionally include wherein the electrical manipulation includes an increase or decrease in a current of the first signal.

In Example 11, the subject matter of any one or more of Examples 7-10 optionally include wherein the electrical manipulation includes an increase or decrease in an impedance of the first signal.

In Example 12, the subject matter of any one or more of Examples 7-11 optionally include wherein allowing the second signal to pass from the terminal device to the peripheral device includes closing a switch to allow the second signal to pass from the terminal device to the peripheral device.

In Example 13, the subject matter of any one or more of Examples 7-12 optionally include wherein the adapter is a portion of a cable connecting the terminal device to the peripheral device.

In Example 14, the subject matter of any one or more of Examples 7-13 optionally include wherein the first end is a USB-C type connector and the second end is a USB-B connector.

In Example 15, the subject matter of any one or more of Examples 7-14 optionally include wherein the first end is a USB-C type connector and the second end is a PoweredUSB connector.

Example 16 is a system comprising: a terminal device; a peripheral device; and a cable electrically coupling the terminal device to the peripheral device, the cable including: a first end electrically coupled to the terminal device, a second end electrically coupled to the peripheral device, and a logic circuit electrically coupling the first end to the send end, the logic circuit operative to perform a handshake operation between the terminal device and the peripheral device to determine compatibility between the terminal device and the peripheral device.

In Example 17, the subject matter of Example 16 optionally includes wherein the logic circuit is further operative to increase a voltage of a first signal transmitted from the terminal device to the peripheral device.

In Example 18, the subject matter of any one or more of Examples 16-17 optionally include wherein the logic circuit is further operative to decrease a voltage of a first signal transmitted from the terminal device to the peripheral device.

In Example 19, the subject matter of any one or more of Examples 16-18 optionally include wherein the first end is a USB-C type connector and the second end is a USB-B connector.

In Example 20, the subject matter of any one or more of Examples 16-19 optionally include wherein the first end is a USB-C type connector and the second end is a PoweredUSB connector.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A system comprising:
    a terminal device including a switch and a controller;
    a peripheral device; and
    a cable electrically coupling the terminal device to the peripheral device, the cable including:
        a first end electrically coupled to the terminal device,
        a second end electrically coupled to the peripheral device, and
        a logic circuit electrically coupling the first end to the second end, the logic circuit comprising a first comparator and a second comparator, the logic circuit operative to:
            manipulate a first signal transmitted by the controller and received at the first comparator,
            receive at the second comparator, from the controller, a second signal,
            transmit, by the first comparator, a third signal to the controller, and
            transmit, by the second comparator, a fourth signal to the controller, the controller operative to:
        determine that the third and fourth signals are within predetermined ranges, and
        transmit a fifth signal to the switch to close the switch when the electrical signal and the fourth signal are within the predetermined ranges.

2. The system of claim 1, wherein manipulating the first signal includes increasing a voltage of the first signal.

3. The system of claim 1, wherein manipulating the first signal includes decreasing a voltage of the first signal.

4. The system of claim 1, wherein the first end is a USB—C type connector and the second end is a USB-B connector.

5. The system of claim 1, wherein the first end is a USB-C type connector and the second end is a PoweredUSB connector.

6. The system of claim 1, wherein the adapter further comprises a transformer operative to:
   receive the fifth signal from the terminal device;
   step up the voltage of the fifth signal to a stepped-up voltage; and
   transmit the stepped-up voltage to the peripheral device.

* * * * *